(12) United States Patent
Ramakrishnan et al.

(10) Patent No.: US 8,930,408 B2
(45) Date of Patent: *Jan. 6, 2015

(54) ATTRIBUTE-BASED LINKED TRIES FOR RULE EVALUATION

(75) Inventors: Arun Ramakrishnan, Chennai (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 13/568,885

(22) Filed: Aug. 7, 2012

(65) Prior Publication Data

US 2014/0006456 A1 Jan. 2, 2014

Related U.S. Application Data

(63) Continuation of application No. 13/539,748, filed on Jul. 2, 2012, now Pat. No. 8,732,207.

(51) Int. Cl.
*G06F 7/00* (2006.01)
*G06F 17/00* (2006.01)
*G06Q 30/00* (2012.01)

(52) U.S. Cl.
USPC ............................................ 707/797; 706/47

(58) Field of Classification Search
USPC ................. 707/797, 790; 706/45, 47
See application file for complete search history.

(56) References Cited

U.S. PATENT DOCUMENTS

| 5,751,914 | A | * | 5/1998 | Coley et al. ................ 706/47 |
|---|---|---|---|---|
| 6,829,602 | B2 | | 12/2004 | Avadhanam et al. |
| 7,023,859 | B2 | | 4/2006 | Paul et al. |
| 7,440,461 | B2 | | 10/2008 | Sahita et al. |
| 7,539,153 | B1 | | 5/2009 | Liang et al. |
| 7,624,141 | B2 | | 11/2009 | Cabrera et al. |
| 7,707,026 | B2 | | 4/2010 | Liu |
| 7,809,744 | B2 | | 10/2010 | Nevidomski et al. |
| 8,019,709 | B2 | * | 9/2011 | Norton et al. ............... 706/45 |
| 2003/0156590 | A1 | * | 8/2003 | Paul et al. ................ 370/400 |
| 2005/0060372 | A1 | | 3/2005 | DeBettencourt et al. |
| 2005/0135380 | A1 | | 6/2005 | Sahita et al. |
| 2005/0198108 | A1 | | 9/2005 | Cabrera et al. |
| 2006/0004744 | A1 | * | 1/2006 | Nevidomski et al. ........ 707/4 |
| 2010/0325079 | A1 | * | 12/2010 | Norton et al. ............... 706/47 |
| 2014/0006455 | A1 | | 1/2014 | Ramakrishnan et al. |

OTHER PUBLICATIONS

Shang et al., "Tries for Approximate String Matching," IEEE Translations on Knowledge and Data Engineering, 8(4):540-547, Aug. 1996.

(Continued)

*Primary Examiner* — Hung T Vy
(74) *Attorney, Agent, or Firm* — Yee & Associates, P.C.; Jeffrey S. LaBaw (57) ABSTRACT

An embodiment for evaluating rules pertaining to an event includes providing a rule trie comprising multiple nodes, wherein match conditions must be met to trigger a given rule, and each match condition corresponds to a different node. An attribute trie is provided for a string attribute, which includes a node sequence having a value. The string attribute is extracted from the event and also has a value. The value of the extracted string attribute and the value of the node sequence are compared, by traversing a path extending along the node sequence. Responsive to determining that the values of the extracted string attribute and the node sequence are the same, notice is provided that the match condition of a particular node of the rule trie has been met by an attribute of the received event.

20 Claims, 5 Drawing Sheets

(56) References Cited

OTHER PUBLICATIONS

Doorenbos, "Production Matching for Large Learning Systems", Thesis, Computer Science Department, Carnegie-Mellon University, Pittsburgh, Pennsylvania, pp. 1-208, Jan. 31, 1995.

Aho et al., "Efficient string matching: An Aid to Bibliographic Search," Communications of the ACM, 18(6):333-340, Jun. 1975.

"Rete Algorithm," Wikipedia, http://en.wikipedia.org/wiki/Rete_algorithm, accessed Jun. 26, 2012, 10 pages.

"IBM ILOG," International Business Machines Corporation, http://www-01.ibm.com/software/websphere/ilog, accessed Jun. 26, 2012, 2 pages.

Ramakrishnan et al, "Attribute-Based Linked Tries for Rule Evaluation", USPTO U.S. Appl. No. 13/539,748, filed Jul. 2, 2012, 28 pages.

Notice of Allowance dated Jan. 9, 2014, regarding USPTO U.S. Appl. No. 13/539,748, 21 pages.

\* cited by examiner

ATTRIBUTE-BASED LINKED TRIES FOR RULE EVALUATION

This application is a continuation of and claims the benefit of priority to U.S. patent application Ser. No. 13/539,748, filed on Jul. 2, 2012 and entitled "ATTRIBUTE-BASED LINKED TRIES FOR RULE EVALUATION". The contents of which are hereby incorporated by reference.

BACKGROUND

1. Field

The invention disclosed and claimed herein generally pertains to a method and apparatus for evaluating rules which pertain to events in a data processing system, wherein the rules are evaluated by determining which of them are triggered or activated by an event. More particularly, the invention pertains to a method and apparatus of the above type wherein the given event has one or more string attributes which are used in the rule evaluation process.

2. Description of the Related Art

A typical enterprise information technology (IT) set up in a large organization is a complex system consisting of many individual but interacting components. The fact that most of these components are essentially independent of each other means that ensuring that they all work in harmony requires a lot of effort. Certain well known IT management products help an administrator monitor and maintain the health of the IT system by providing him or her with various indicators and alerts. The administrator can either use experience or some sort of knowledge base to make decisions based on events such as these indicators and alerts.

More advanced management systems are capable of automatically processing these types of events with digital knowledge sources such as policies and rules. Such systems can provide recommendations to the administrator, or even perform automated corrective actions. However, when IT systems grow in size, the size of the knowledge base, including event related rules and policies, also becomes very large. In order to reduce or avoid system down time in real-time scenarios, the IT management system must react quickly to generated events. With a very large number of rules, the approach provided by traditional rules evaluation methods (e.g. XPath, SQL and Impact) involves running each of the rules against the event, and most often evaluating the values of one or more attributes of the event. As the number of rules increase, the performance of this approach degrades significantly. The IT management system is no longer able to keep up with the pace of incoming events, or to maintain the health of the IT solution. Similar situations exist in expert systems which handle very large volumes of data. For example, retail organizations perform a lot of data processing to understand trends to assist with their strategy.

Matching algorithms such as the Rete algorithm improve on the above approach by using state saving and sharing of nodes with similar match conditions. In many systems, productions (or conditions) are based on text attributes of facts. The Rete algorithm is able to save states and merge productions, but, matching is still done individually, across fact attribute values. The Rete method still relies on individual comparisons for match conditions, which translates to one evaluation for each attribute and match condition pair. For these rule matching approaches, it is difficult to perform efficiently, if the attributes include significant string-based attributes. For the Rete algorithm, the matching approach still forces an exponentially increasing number of comparisons, as the data and match rules continue to increase.

SUMMARY

Large enterprises running an extensive IT infrastructure typically have numbers of servers running into thousands, and often the amount of data generated increases exponentially (with multiple components, integrations and interactions). In order to be able to extract valuable information from this data (e.g. to understand health, trends, IT and business performance, and the like), the data needs to be processed efficiently, and more importantly as and when the data is generated.

Embodiments of the invention can be implemented as a method, apparatus, and a computer program product in order to achieve the above objectives. One embodiment is directed to a computer implemented method for evaluating rules that pertain to an event having a string attribute. The method includes the step of providing a rule trie comprising a number of nodes, wherein match conditions must be met to trigger a given rule, and each match condition corresponds to a different node. The method further includes providing a string attribute trie for the string attribute, wherein the attribute trie includes a node sequence associated with a particular value that is a match condition of a particular node of the rule trie. The method further comprises configuring a link between a specified node of the node sequence of the string attribute trie, and the particular node of the rule trie. Responsive to receiving the event, the string attribute is extracted from the event, wherein the extracted string attribute has a value. The method further includes comparing the value of the extracted string attribute with the associated value of the node sequence, by traversing a path that extends along the node sequence. Responsive to determining that the value of the extracted string attribute and the associated value of the node sequence are the same, the configured link is used to send notice that the match condition of a particular node of the rule trie has been met by an attribute of the received event.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Typically, a modern IT system generates events, and these events represent facts to be processed. An event could be of any type at all, and typical examples would be events to represent the health of a system, incoming data, or a successful transaction, such as approving a home loan for someone. A particular event produces data comprising one or more types of attributes, wherein respective attributes can have values that will trigger or activate associated rules, also known as productions.

Figure 1:
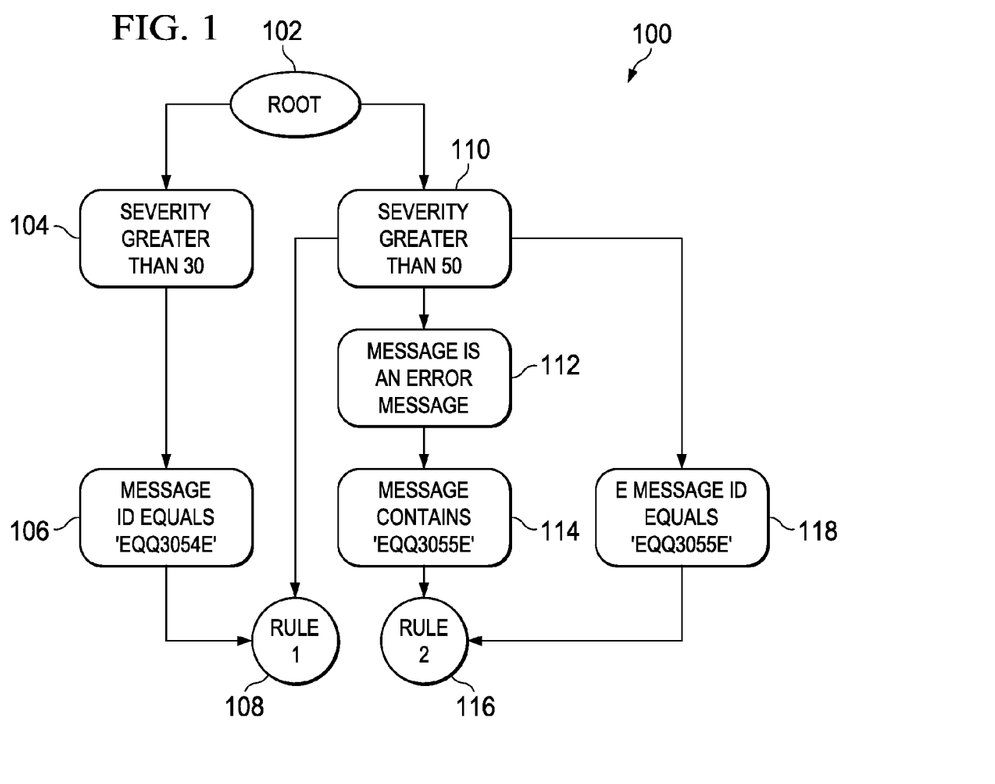
FIG. 1 is a schematic diagram showing a rule trie for an embodiment of the invention.

Referring to FIG. 1, there is shown a simplified set of rules $R_1$ and $R_2$ of the above type for illustrating an embodiment of the invention. More particularly, FIG. 1 depicts a rule trie 100, which has been constructed from the rules as a first step or stage of the embodiment, to show respective nodes of Rules 1 and 2. These rules may pertain, by way of example and not limitation, to an event which comprises an alert or warning message associated with a data processing system. The message event can have multiple types of attributes, which for this embodiment are shown to include a message type, a message identifier or ID, and a severity level. The message type attribute is a string attribute, that is, it comprises a string or sequence of alphanumeric or other characters. The message ID attribute likewise comprises a string attribute of this type. Moreover, the values of these attributes represent and are determined by the particular event which produced them.

Again by way of example and not limitation, the event associated with FIG. 1 could be a condition in a data processing system that should be addressed, such as an error which is presently occurring in a system component. The specific value of the message type attribute could indicate that the message was an error message. The value of the message ID attribute could specifically identify the type of error, and/or the particular system component in which the error is located.

In order to handle events such as message events of the above type, which may occur during operation of the system, the Rules 1 and 2 have been previously specified or defined. Each of these rules has a number of match conditions associated with it, and will be triggered when certain prespecified combinations of its match conditions are met. In some cases a rule will be triggered when just a single match condition is met. Upon being triggered, a rule will cause some predetermined action to be taken, which will be an appropriate response to the particular triggering event.

Referring further to FIG. 1, there is shown each node of trie 100 comprising or corresponding to a rule match condition as described above. Moreover, in constructing the trie 100, the nodes corresponding to each match condition of one of the above prespecified combinations are linked together along a path between a root node 102, and either a leaf node 108 associated with Rule 1, or a leaf node 116 associated with Rule 2. Also, one such path is provided for each prespecified combination of match conditions. Thus, if it is determined that all the match conditions of a particular path are met, the appropriate Rule 1 or Rule 2 will be triggered. In one embodiment, an algorithm would determine the respective match conditions of a rule, and would construct the rule trie by successively adding each match condition to the trie in its correct position.

To illustrate this further, FIG. 1 shows nodes 104-106 linked together along a path extending between root 102 of trie 100 and leaf node 108, associated with Rule 1. Node 104 corresponds to the match condition that severity is greater than 30, and node 106 corresponds to the match condition that the message ID is equal to the value EQQ3054E.

FIG. 1 further shows nodes 110, 112 and 114 linked together along a path extending between root 102 and leaf node 116, associated with Rule 2. Node 110 corresponds to the match condition that severity is greater than 50, node 112 corresponds to the condition that the message is an error message, and node 114 corresponds to the match condition that the message contains the value EQQ3055E. FIG. 1 shows node 110 positioned as the only match condition node on a path between root 102 and the Rule 1 leaf node 108, and nodes 110 and 118 are linked together on a path between root 102 and the Rule 2 leaf node 116.

FIG. 1 thus discloses that traversing along any path of trie 100 from root node 102 to either leaf node 108 or 116 represents a complete production or rule. More specifically, Rule 1 of leaf node 108 will be triggered if the match conditions of nodes 104 and 106 are both met, or caused to occur, by an event. Rule 1 will also be triggered if the single condition of node 110 is met. Rule 2 of leaf node 116 is triggered either by meeting all the match conditions of nodes 110, 112 and 114, or of nodes 110 and 118. Upon being triggered, Rule 1 could, as an example, notify the system administrator that an error of the particular type was occurring at a specific system component. Rule 2 upon being triggered could provide similar notice to the administrator, but for a different component, or with a different level of urgency.

It will be appreciated that rule trie 100 of FIG. 1 shows two rules only by way of example, and for purposes of illustration. In more general cases, the rule trie could represent all the rules available in a system, and all the possible paths that could be taken to trigger a particular rule. As a further, more complex example of an embodiment of the invention, the events could pertain to an application for a housing loan or the like and all the data associated therewith, and the rules would be used in a system to determine whether or not to approve the loan.

Figure 2:
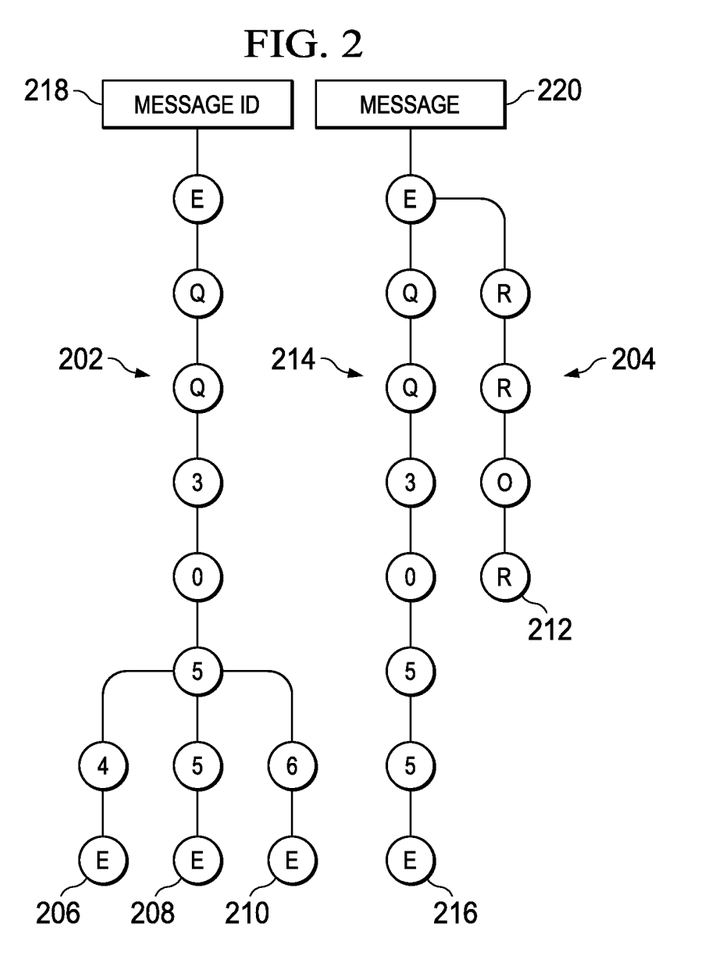
FIG. 2 is a schematic diagram showing respective attribute tries for an embodiment of the invention.

Referring to FIG. 2, there are shown attribute tries 202 and 204, which are respectively constructed as a further step of an embodiment of the invention. As described above, events that affect the system can have attributes that are string attributes, such as a message type string attribute, and a message ID string attribute. A message ID string attribute is used to construct attribute trie 202, which is built to hold all possible values that such attribute can have. FIG. 2 shows these values to be represented by respective sequences of nodes, with each node containing an alphanumeric character. The values include EQQ3054E, EQQ3055E and EQQ3056E, which are obtained by traversing each node sequence from message ID node 218 to leaf nodes 206, 208, 210, respectively.

FIG. 2 similarly shows a message type string attribute used to construct trie 204, which includes the node sequence ERROR, obtained by traversing a path from message node 220 to leaf node 212. Attribute trie 204 could further include other message types (not shown) that could provide conditions for triggering rules. FIG. 2 also shows a message ID value 214 associated with trie 204 ending at a leaf node 216.

Figure 3:
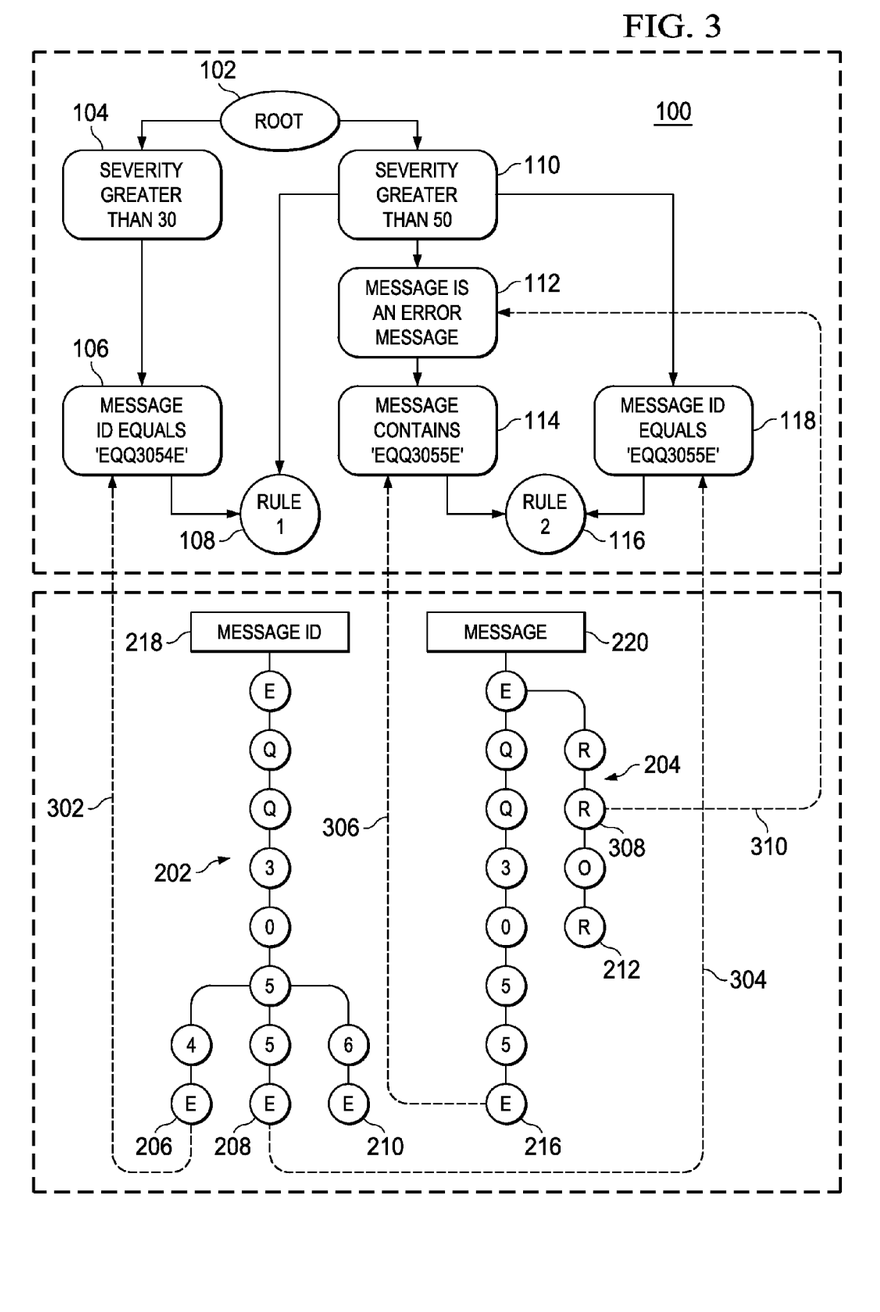
FIG. 3 is a schematic diagram showing both the rule trie of FIG. 1 and the attribute tries of FIG. 2, to further illustrate an embodiment of the invention.

Referring to FIG. 3, there is shown both the rule trie 100 of FIG. 1, and the string attribute tries 202 and 204 of FIG. 2. As described above, the rule trie 100 represents all possible match condition paths that can be taken in order to satisfy Rule 1 and Rule 2. As described above in regard to FIG. 2, the attribute tries are created to represent all possible values that any of the string based attributes could have in the system. Each of these values could affect the triggering of a rule. Accordingly, after constructing the rule trie and the attribute trie, links are established during a setup phase, between each leaf node or end node of the string attribute tries, and one of the condition nodes of the rule trie. More particularly, each string attribute trie end node that could indicate a particular attribute value is linked to a rule trie node that requires that particular value, in order to match its condition.

As an example, FIG. 3 shows end node 206 of message ID attribute trie 202 joined to match condition node 106 of the rule trie, by means of a link 302. This condition is that the message ID equals EQQ3054E, which is the same value provided by traversing the message ID trie from node 218 to end node 206. Accordingly, link 302 is provided to send this value to the rule node, and thereby provide notice that a match has occurred between a string attribute of the event and a match condition node of the rule trie. That node of the rule trie is therefore marked as being met or satisfied, or stated another way, the match condition of that rule node has been triggered.

As further examples, FIG. 3 shows a link 304 between end node 208 and rule trie node 118, and a link 306 between end node 216 of trie 204 and rule node 114. Thus, each of these rule nodes can also be marked as being satisfied.

As a further feature of the embodiment of FIG. 3, a node of an attribute trie which indicates a match with one of the rule condition nodes does not necessarily need to be a leaf node. Instead, it is possible to have an end node with children. As an example of this, FIG. 3 shows that the attribute string or node sequence ERR, which ends at node 308 of attribute trie 204, is sufficient to match the condition of rule node 112. This condition is that the message is an error message. Accordingly, a link 310 is provided between node 308 and rule node 112 to indicate this match.

Figure 4:
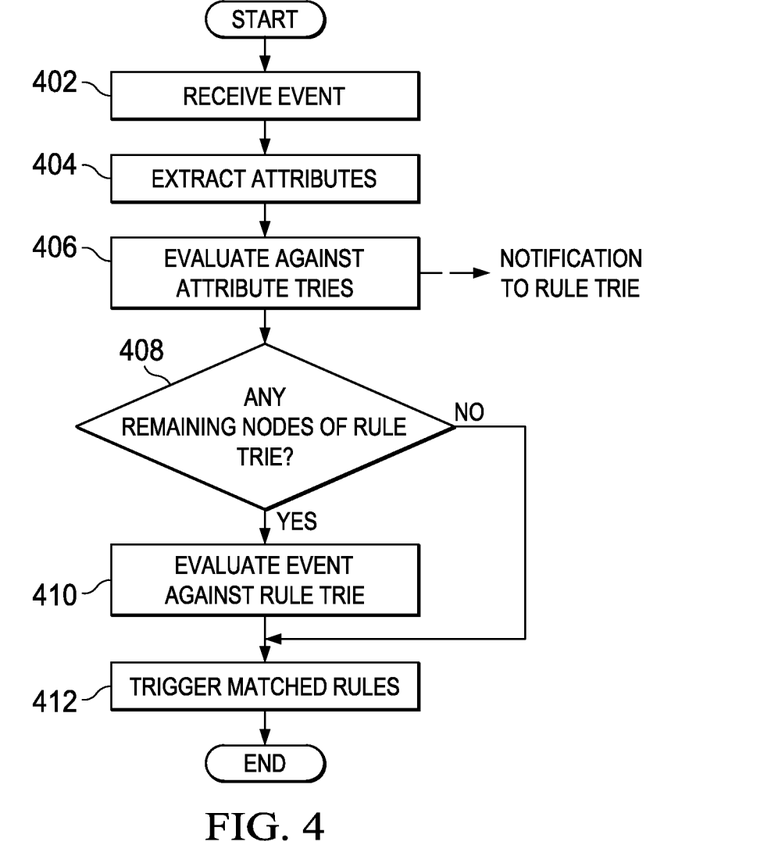
FIG. 4 is a flowchart showing steps for a method comprising an embodiment of the invention.

Referring to FIG. 4, there are shown steps for a method implementing an embodiment of the invention, after the rule trie 100 and the attribute tries 202 and 204 have been built and set up, and links 302-306 and 310 have been established, as shown by FIG. 3. At step 402, an event is received for evaluation, wherein the event could be from any source and in any format.

After receiving the event, the necessary or pertinent string attributes of the event are extracted therefrom at step 404. More particularly, these attributes are determined by the previously constructed attribute tries. For example, the string attribute tries of FIGS. 2 and 3 show the attributes message type and message ID. Thus, if either of these attribute types were included in a received event, they would be extracted at step 404.

At step 406, each extracted attribute is evaluated, by means of its corresponding attribute trie. This is done by pushing each extracted attribute value into its corresponding attribute trie, in order to determine whether such extracted value is one of the values that was built into the trie, and thus matches one of the rule nodes. Accordingly, if an attribute value extracted from a received event is a message ID attribute, the extracted value will be compared with respective nodes of trie 202. This is carried out by traversing each path between node 218 and the respective end nodes 206-210. If the string attribute value extracted from the event matches one of these values built into trie 202, a notification of the match is sent to the corresponding node of rule trie 100, such as by means of a link as described above.

More particularly, each node sequence of a string attribute trie comprises a sequence of alphanumeric characters, as described above. Moreover, a string attribute extracted from an event likewise comprises a sequence of alphanumeric characters. Accordingly, the evaluation process of step 406 is carried out by sequentially comparing each character in the extracted string attribute sequence with the character at the same, or corresponding, location in the attribute trie node sequence which corresponds to, or is the same type as, the extracted string attribute. Thus, each extracted string attribute is evaluated at a character by character level, which substantially improves the efficiency of rule matching. The above evaluation process is also referred to herein as traversing a path that extends along a node sequence of a trie attribute.

When the values of all extracted attributes have been evaluated, one or more of the match condition nodes may have been notified of a match, as described above, and set to a "matched state". However, respective attributes of the attribute tries 202 and 204 pertain only to string attributes, and it is anticipated that the match conditions of one or more of the rule trie nodes are not addressed by any of the trie attributes. This is clearly the case, for example, for the match condition nodes 104 and 110 of the rule trie. Accordingly, the method of FIG. 4 proceeds to step 408. At this step, it is determined whether there are any remaining match condition nodes of the rule trie, that is, any conditions that will not be matched or shown by any string attribute of an event.

If the determination at step 408 is negative, the method proceeds to step 412. Otherwise, the method proceeds to step 410, to evaluate the event against the rule trie. At this step, the entire event is pushed into the rule trie, to perform non-string attribute evaluations. The event is moved down the rule trie from node to node, either breadth-first or depth-first. The conditions on each node are evaluated when the node is reached. For example, when an event reaches node 104 of rule trie 100, it would be determined whether the event had a severity in excess of 30. At node 110, a severity that exceeded 50 would be looked for in the event.

When a match occurs at a rule node during step 410, all child nodes of that rule node receive the event for evaluation. If the event reaches a rule node that was previously matched by a string attribute value, during step 406, child nodes of that matched node likewise receive the event. When the event finally traverses the rule trie, each leaf node reached by the event will signify a completely matched rule or production.

At step 412, the system is notified of each rule that has matched the event, and has thus been triggered. The rule trie is then reset to clear the match states of the processed event, and the system is ready to receive the next event.

It will be appreciated that in some embodiments of the invention, attribute tries could be constructed from string attributes of an event to evaluate numeric match condition nodes, such as nodes 104 and 106 of rule trie 100. However, in computer systems it will generally be faster to do a numeric comparison as a numeric comparison, rather than convert a number to a string, and then compare respective elements thereof.

Figure 5:
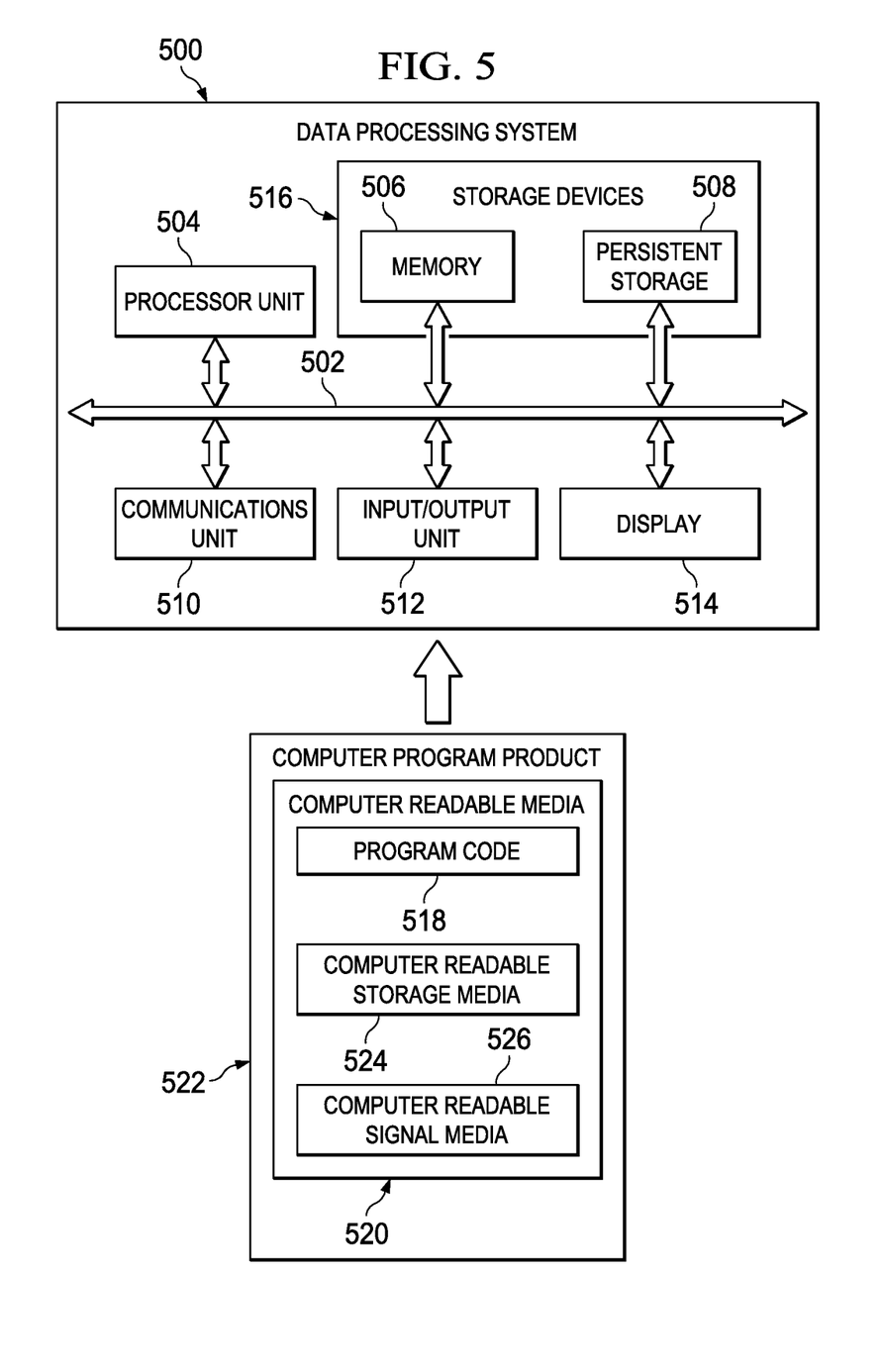
FIG. 5 is a block diagram showing a computer or data processing system that may be used in implementing embodiments of the invention.

Referring to FIG. 5, a block diagram of a data processing system is depicted, which may be used in implementing embodiments of the invention. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer-readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer-usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these examples. In one example, computer-readable media 520 may be computer-readable storage media 524. Computer-readable storage media 524 may include, for example, an optical or magnetic disk that is inserted or placed into a drive or other device that is part of persistent storage 508 for transfer onto a storage device, such as a hard drive, that is part of persistent storage 508. Computer-readable storage media 524 also may take the form of a persistent storage, such as a hard drive, a thumb drive, or a flash memory, that is connected to data processing system 500. In some instances, computer-readable storage media 524 may not be removable from data processing system 500.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

As another example, a storage device in data processing system 500 is any hardware apparatus that may store data. Memory 506, persistent storage 508, and computer-readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product comprising instructions stored in a non-transitory storage medium and executable by a data processor for evaluating one or more rules that pertain to an event having a string attribute, said instructions comprising:
   instructions for providing a rule trie comprising a number of nodes, wherein one or more match conditions must be met to trigger a given rule, and each match condition corresponds to a different node of the rule trie;
   instructions for providing a string attribute trie for the string attribute, wherein the string attribute trie includes a node sequence that is associated with a particular value that is a match condition of a particular node of the rule trie;
   instructions for configuring a link between a specified node of the node sequence of the string attribute trie, and the particular node of the rule trie;
   instructions responsive to receiving the event, for extracting the string attribute from the event, wherein the extracted string attribute has a value;
   instructions for comparing the value of the extracted string attribute with the associated value of the node sequence by traversing a path that extends along the node sequence; and
   instructions responsive to determining that the value of the extracted string attribute and the associated value of the node sequence are the same for using the configured link to send notice that the match condition of the particular node of the rule trie has been met by the extracted string attribute of the received event.

2. The computer program product of claim 1, wherein:
the extracted string attribute and the node sequence of the string attribute trie each comprises a sequence of alphanumeric characters, and the value of the extracted string attribute is compared by comparing each character of the extracted string attribute with a corresponding character of the node sequence.

3. The computer program product of claim 1, wherein:
an attribute trie is used to extract each string attribute from the received event.

4. The computer program product of claim 1, wherein:
the node sequence included in the string attribute trie comprises one of multiple node sequences that are included in one or a plurality of string attribute tries, selectively, and each node sequence corresponds to a different node of the rule trie, and has an associated value that matches the match condition of its corresponding rule trie node.

5. The computer program product of claim 4, wherein:
a link is provided from an end node of each node sequence to the corresponding rule trie node thereof, for use in notifying the rule trie node when its match condition is met by an attribute of the received event.

6. The computer program product of claim 4, wherein:
subsequent to traversing each of the node sequences, each rule that has had a prespecified combination, or a prespecified one, selectively, of its match conditions met is triggered.

7. The computer program product of claim 1, wherein:
subsequent to traversing each node sequence included in an attribute trie, it is determined whether the received event includes any attributes that are not string attributes.

8. The computer program product of claim 1, wherein:
responsive to determining that the received event includes one or more attributes that are not string events, the received event is evaluated against the rule trie.

9. The computer program product of claim 1, wherein:
the match condition of at least one of the rule trie nodes comprises a numeric match condition.

10. The computer program product of claim 9, wherein:
an instruction determines whether each numeric match condition has been met by an attribute of the received event.

11. A computer apparatus for evaluating one or more rules that pertain to an event having a string attribute, said apparatus comprising:
a data processor coupled to a memory, and program code that is configured to perform, when executed by the data processor, steps of:
providing a rule trie comprising a number of nodes, wherein one or more match conditions must be met to trigger a given rule, and each match condition corresponds to a different node of the rule trie;
providing a string attribute trie for the string attribute, wherein the string attribute trie includes a node sequence that is associated with a particular value that is a match condition of a particular node of the rule trie;
configuring a link between a specified node of the node sequence of the string attribute trie, and the particular node of the rule trie;
receiving the event, extracting the string attribute from the event, wherein the extracted string attribute has a value;
comparing the value of the extracted string attribute with the associated value of the node sequence by traversing a path that extends along the node sequence; and
responsive to determining that the value of the extracted string attribute and the associated value of the node sequence are the same, using the configured link to send notice that the match condition of a particular node of the rule trie has been met by an attribute of the received event.

12. The apparatus of claim 11, wherein:
the extracted string attribute and the node sequence of the string attribute trie each comprises a sequence of alphanumeric characters, and the value of the extracted string attribute is compared by comparing each character of the extracted string attribute with a corresponding character of the node sequence.

13. The apparatus of claim 11, wherein:
an attribute trie is used to extract each string attribute from the received event.

14. The apparatus of claim 11, wherein:
the node sequence included in the string attribute trie comprises one of multiple node sequences that are included in one or a plurality of string attribute tries, selectively, and each node sequence corresponds to a different node of the rule trie, and has an associated value that matches the match condition of its corresponding rule trie node.

15. The apparatus of claim 14, wherein:
a link is provided from an end node of each node sequence to the corresponding rule trie node thereof, for use in notifying the rule trie node when its match condition is met by an attribute of the received event.

16. The apparatus of claim 14, wherein:
subsequent to traversing each of the node sequences, each rule that has had a prespecified combination, or a prespecified one, selectively, of its match conditions met is triggered.

17. The apparatus of claim 11, wherein:
subsequent to traversing each node sequence included in an attribute trie, it is determined whether the received event includes any attributes that are not string attributes.

18. The apparatus of claim 11, wherein:
responsive to determining that the received event includes one or more attributes that are not string events, the received event is evaluated against the rule trie.

19. The apparatus of claim 11, wherein:
the match condition of at least one of the rule trie nodes comprises a numeric match condition.

20. The apparatus of claim 19, wherein:
the apparatus determines whether each numeric match condition has been met by an attribute of the received event.

* * * * *